United States Patent
Davidson

(10) Patent No.: US 12,087,899 B1
(45) Date of Patent: Sep. 10, 2024

(54) ELECTRODE AND SEPARATOR FEED SYSTEM AND METHOD OF USE

(71) Applicant: Energizer Brands, LLC, St. Louis, MO (US)

(72) Inventor: Gregory James Davidson, Oregon, WI (US)

(73) Assignee: Energizer Brands, LLC, St. Louis, MO (US)

( * ) Notice: Subject to any disclaimer, the term of this patent is extended or adjusted under 35 U.S.C. 154(b) by 120 days.

(21) Appl. No.: 17/324,260

(22) Filed: May 19, 2021

(51) Int. Cl.
| | |
|---|---|
| H01M 10/04 | (2006.01) |
| H01M 50/403 | (2021.01) |
| H01M 50/463 | (2021.01) |

(52) U.S. Cl.
CPC ... *H01M 10/0431* (2013.01); *H01M 10/0404* (2013.01); *H01M 10/0409* (2013.01); *H01M 50/403* (2021.01); *H01M 50/463* (2021.01)

(58) Field of Classification Search
CPC ............. H01M 10/0431; H01M 10/04; H01M 10/0409; H01M 50/403; H01M 50/463
See application file for complete search history.

(56) References Cited

U.S. PATENT DOCUMENTS

| | | | |
|---|---|---|---|
| 3,989,579 A * | 11/1976 | Sheldon | B29C 66/8322 156/499 |
| 4,343,869 A | 8/1982 | Oltman et al. | |
| 4,369,568 A | 1/1983 | Dopp | |
| 4,930,327 A * | 6/1990 | Aidlin | H01M 10/0409 72/148 |
| 5,306,582 A | 4/1994 | Tanaka | |
| 5,451,473 A | 9/1995 | Oltman et al. | |
| 5,567,539 A | 10/1996 | Takahashi et al. | |
| 5,766,791 A | 6/1998 | Takahashi et al. | |
| 5,958,617 A | 9/1999 | Kozuki et al. | |
| 6,436,156 B1 | 8/2002 | Wandeloski et al. | |
| 6,451,478 B1 | 9/2002 | Okahisa et al. | |
| 6,468,691 B1 | 10/2002 | Malay et al. | |
| 6,521,373 B1 | 2/2003 | Suzuki et al. | |
| 6,521,379 B2 | 2/2003 | Nishida et al. | |

(Continued)

FOREIGN PATENT DOCUMENTS

| | | |
|---|---|---|
| EP | 2 538 484 B1 | 12/2012 |
| WO | WO-2016/202556 A1 | 12/2016 |

*Primary Examiner* — Matthew T Martin
*Assistant Examiner* — Adam J Francis
(74) *Attorney, Agent, or Firm* — Foley & Lardner LLP

(57) ABSTRACT

A winding system for coiling an electrode assembly includes a housing, a winding pin, and a feed system. The feed system is supported by the housing, and includes a guide assembly and an indexing assembly. The guide assembly guides an electrode and a separator towards the winding pin. The indexing assembly is operably attached to the guide assembly to actuate a movement of the guide assembly between a retracted and an extended position. In the retracted position, the distal end of the guide assembly is separated from the winding pin, thus facilitating the initial capture of the separator and electrode components during an initial set-up of the winding system. In the extended position, the distal end of the guide assembly is brought into close proximity with the winding pin, thus reducing the risk of separator and/or electrode misalignment during operating of the winding system in a winding mode.

18 Claims, 14 Drawing Sheets

(56) References Cited

U.S. PATENT DOCUMENTS

| | | | |
|---|---|---|---|
| 6,534,952 B1 * | 3/2003 | Ishikawa | H01M 10/0409 |
| | | | 320/107 |
| 6,537,693 B1 | 3/2003 | Suzuki et al. | |
| 6,602,629 B1 | 8/2003 | Guo et al. | |
| 6,610,353 B1 | 8/2003 | Gibbons et al. | |
| 6,716,552 B2 | 4/2004 | Zhang et al. | |
| 7,001,439 B2 | 2/2006 | Buckle | |
| 7,001,689 B2 | 2/2006 | Buckle | |
| 7,223,496 B2 | 5/2007 | Takahashi et al. | |
| 7,452,627 B2 | 11/2008 | Lee | |
| 7,455,882 B2 | 11/2008 | Gibbons et al. | |
| 7,470,482 B2 | 12/2008 | Takamura et al. | |
| 7,709,141 B2 | 5/2010 | Kim et al. | |
| 7,816,026 B2 | 10/2010 | Janmey | |
| 7,842,414 B2 | 11/2010 | Hong et al. | |
| 7,960,048 B2 | 6/2011 | Jang et al. | |
| 7,993,778 B2 | 8/2011 | Yim et al. | |
| 8,048,559 B2 | 11/2011 | Kim | |
| 8,062,787 B2 | 11/2011 | Kim | |
| 8,173,296 B2 | 5/2012 | Lee | |
| 8,288,036 B2 | 10/2012 | Kim | |
| 8,298,704 B2 | 10/2012 | Matsuhisa et al. | |
| 8,394,533 B2 | 3/2013 | Bak | |
| 8,399,125 B2 | 3/2013 | Kim | |
| 8,409,736 B2 | 4/2013 | Wang et al. | |
| 8,455,124 B2 | 6/2013 | Kim | |
| 8,541,132 B2 | 9/2013 | Kim | |
| 8,546,007 B2 | 10/2013 | Lee et al. | |
| 8,673,485 B2 | 3/2014 | Yamazaki et al. | |
| 8,679,672 B2 | 3/2014 | Yamaguchi et al. | |
| 8,815,437 B2 | 8/2014 | Lee | |
| 8,865,344 B2 | 10/2014 | Kim et al. | |
| 8,940,435 B2 | 1/2015 | Kim et al. | |
| 8,945,242 B2 | 2/2015 | Mineya et al. | |
| 8,993,148 B2 | 3/2015 | Wang et al. | |
| 9,005,802 B2 | 4/2015 | Humphrys et al. | |
| 9,034,512 B2 | 5/2015 | Sato et al. | |
| 9,083,053 B2 | 7/2015 | Humphrys | |
| 9,178,188 B2 | 11/2015 | Lim | |
| 9,178,190 B2 | 11/2015 | Kim et al. | |
| 9,178,251 B2 | 11/2015 | Gaugler | |
| 9,350,004 B2 | 5/2016 | Kim | |
| 9,502,698 B2 | 11/2016 | Takahashi et al. | |
| 9,515,301 B2 | 12/2016 | Hattori | |
| 9,564,654 B2 | 2/2017 | Wang et al. | |
| 9,614,247 B2 | 4/2017 | Ensling et al. | |
| 9,748,550 B2 | 8/2017 | Kim | |
| 9,755,203 B2 | 9/2017 | Kim et al. | |
| 9,793,572 B2 | 10/2017 | Lee et al. | |
| 10,128,477 B2 | 11/2018 | Lee et al. | |
| 10,164,306 B2 | 12/2018 | Allen et al. | |
| 10,193,125 B2 | 1/2019 | Doo et al. | |
| 10,283,750 B2 | 5/2019 | Lee et al. | |
| 10,418,620 B2 | 9/2019 | Lee et al. | |
| 2003/0013014 A1 | 1/2003 | Ashihara et al. | |
| 2003/0104275 A1 | 6/2003 | Ishida et al. | |
| 2004/0197645 A1 | 10/2004 | Buckle | |
| 2006/0123622 A1 * | 6/2006 | Guy | H01G 13/02 |
| | | | 29/700 |
| 2007/0054168 A1 | 3/2007 | Chang et al. | |
| 2007/0224495 A1 | 9/2007 | Gibbons et al. | |
| 2007/0224500 A1 | 9/2007 | White et al. | |
| 2008/0206628 A1 | 8/2008 | Honbou | |
| 2008/0254354 A1 | 10/2008 | Adams | |
| 2009/0068346 A1 * | 3/2009 | Usui | H01M 4/26 |
| | | | 118/712 |
| 2009/0098445 A1 | 4/2009 | Kim | |
| 2010/0291422 A1 | 11/2010 | Deng et al. | |
| 2011/0250488 A1 | 10/2011 | Park | |
| 2012/0321960 A1 | 12/2012 | Kim et al. | |
| 2013/0230749 A1 | 9/2013 | Kim et al. | |
| 2014/0045009 A1 | 2/2014 | Kim | |
| 2014/0147716 A1 | 5/2014 | Oh et al. | |
| 2014/0220394 A1 | 8/2014 | Kim et al. | |
| 2014/0287298 A1 | 9/2014 | Sumihiro | |
| 2015/0118545 A1 | 4/2015 | Komatsu et al. | |
| 2016/0079584 A1 | 3/2016 | Lee et al. | |
| 2017/0062778 A1 | 3/2017 | Mille et al. | |
| 2017/0279087 A1 | 9/2017 | Tsuda et al. | |
| 2018/0219199 A1 | 8/2018 | Lee et al. | |
| 2018/0301668 A1 | 10/2018 | Nicholls | |
| 2019/0140305 A1 * | 5/2019 | Sale | H01G 13/02 |
| 2019/0165411 A1 | 5/2019 | Tu et al. | |
| 2020/0295330 A1 | 9/2020 | Armacanqui et al. | |
| 2021/0308932 A1 * | 10/2021 | Kishi | B29C 53/8016 |

* cited by examiner

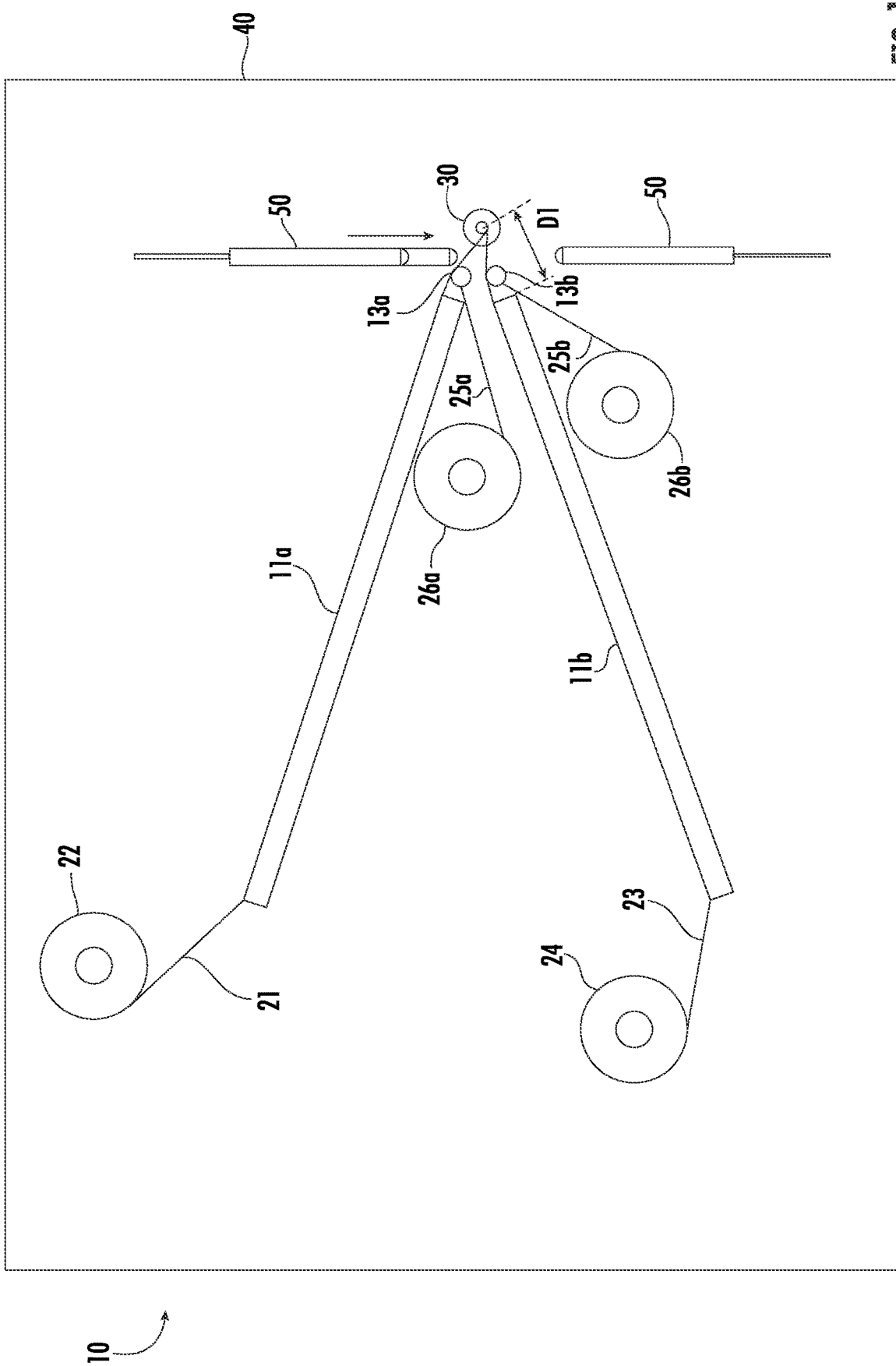

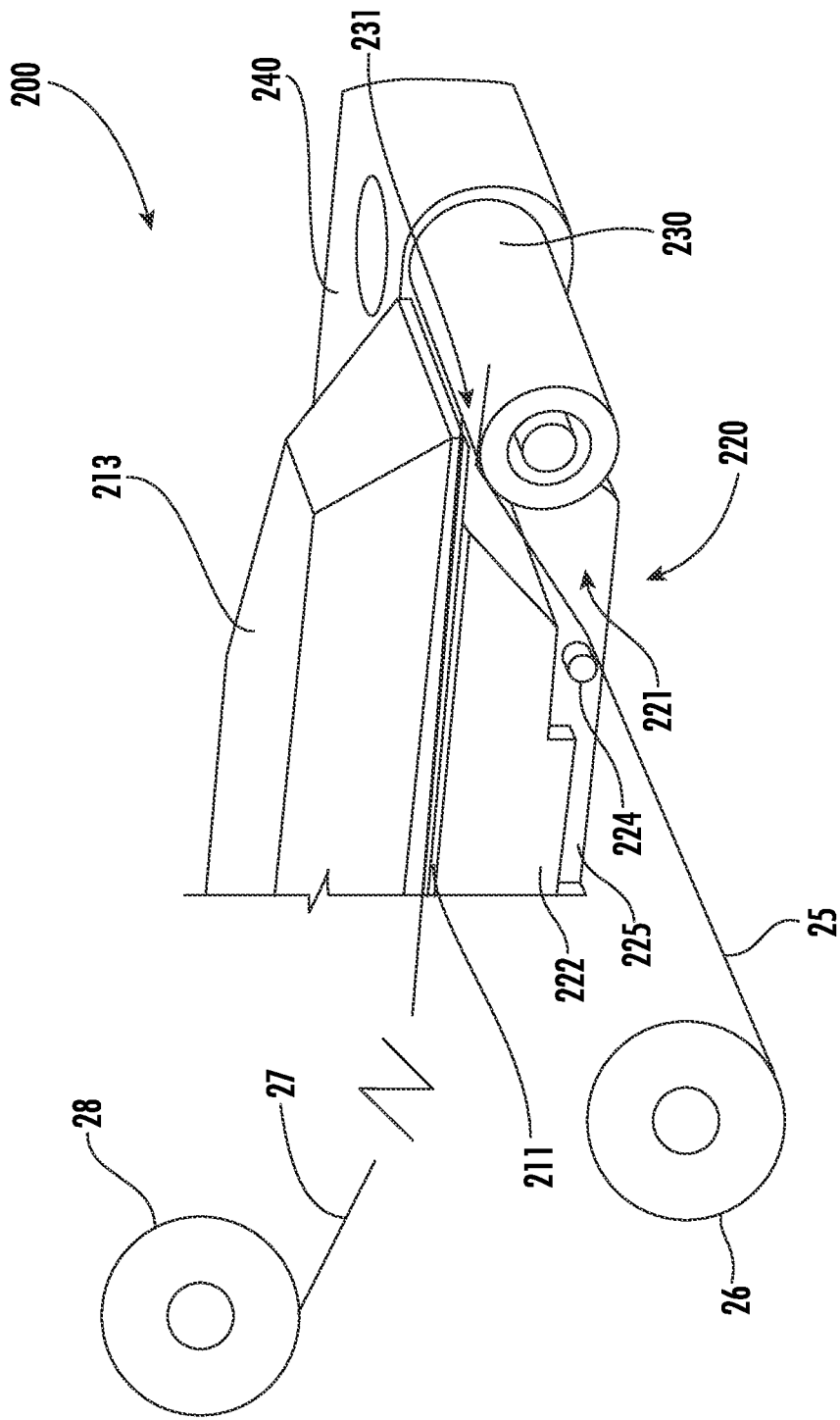

ELECTRODE AND SEPARATOR FEED SYSTEM AND METHOD OF USE

FIELD

The present technology relates generally to batteries. More particularly, the technology relates to rechargeable batteries for use in hearing aid devices.

BACKGROUND

During the assembly of a wound cell (e.g., a jellyroll), the alignment of the cathode, anode, and separator components of the cell relative to one another is important in ensuring the safety and efficacy of the assembled, wound cell. For example, a misalignment of a separator layer that results in a portion of the separator layer not being positioned between an adjacent anode layer and catheter layer may cause a short of the cell. As another example, the failure of an anode layer to completely overlay an adjacent cathode layer may compromise the capacity and/or the safety of the wound cell.

To avoid undesirable effects on safety and efficacy of an assembled wound cell, the widths of the anode and/or separator components used in making the wound cell are often sized greater than needed. Alternatively, or additionally, a width of the cathode layer used to form the wound cell is often sized less than a maximum allowable width. However, although such adjustments to the width(s) of the anode, cathode, and/or separator may increase winding alignment tolerance—and thereby improve the safety of the assembled cell—these adjustments come at the cost of decreasing the capacity of the cell.

The decrease in efficiency associated with achieving a desired winding alignment tolerance may be particularly problematic in smaller cells (e.g., cells having an assembled height of less than 6 mm). Notably, given the already small dimensions of such cells, even minor adjustments to the width of the anode, cathode and/or separator components used to form such cells may significantly impact the capacity of the wound cell. Accordingly, it would be advantageous to provide a winding system configured to accurately and precisely align cathode, anode and separator components relative to one another during the winding of a wound cell, so as to decrease (e.g., eliminate) the need to rely on adjustments in the widths of the cathode, anode and/or separator components to meet desired winding alignment tolerances.

SUMMARY

According to one implementation of the present disclosure, a winding system for coiling an electrode assembly includes a housing, a winding pin, and a feed system. The winding pin is rotatably mounted relative to the housing. The feed system is supported by the housing, and includes a guide assembly and an indexing assembly. The guide assembly is configured to guide an electrode and a separator towards the winding pin. The guide assembly includes a guide plate, and an electrode guide, a separator guide, and a roller element. The electrode guide defines a track along an upper surface of the guide plate. The separator guide is located at a distal end of the guide plate. The separator guide defines a passageway along a lower surface of the guide plate. The roller element is supported at a distal end of the guide plate. The indexing assembly is operably attached to the guide assembly and includes an actuatable element. A rotation of the winding pin relative to the housing is configured to cause an electrode and a separator fed towards the winding pin by the guide assembly to be coiled into a jellyroll configuration.

In some embodiments, the indexing assembly is configured to transition the guide assembly between a first position and a second position different than the first position upon actuation of the actuatable element. A distance between a distal end of the guide assembly and the winding pin when the guide assembly is in the first position is different than a distance between the distal end of the guide assembly and the winding pin when the guide assembly is in the second position.

The electrode guide may include a pair of walls laterally spaced apart from one another to define the track. At least one of the walls is optionally laterally adjustable relative to the guide plate such that a width of the track may be varied. The separator guide is optionally adjustably supported relative to a width of the guide plate, such that central axis along which the passageway defined by the separator guide extends may be laterally adjusted relative to a central axis along which the track defined by the electrode guide extends.

The feed system optionally includes a first feed system and a second feed system. The electrode guided towards the winding pin by one of the first feed system and the second feed system includes an anode. The electrode guided towards the winding pin by the other of the first feed system and the second feed system includes a cathode. A restraining element is optionally supported above a distal end of the guide plate of the first feed system. The restraining element is configured to restrain movement of electrode and separator passing over a top of the roller element in a vertical direction. In some embodiments, the first feed system and second feed system are supported relative to the housing such that a lower portion of a distal end of the first feed system is arranged adjacent to an upper portion of a distal end of the second feed system, such that movement of electrode and separator passing over a top of the roller element of the second feed system in a vertical direction is restrained by the distal end of the first feed system.

According to one implementation of the present disclosure, a feed system for a winding system includes a guide assembly and an indexing assembly. The guide assembly includes a guide plate, an electrode guide, a separator guide, and a roller element. The guide plate has an upper surface and a lower surface. The electrode guide is supported relative to the upper surface of the guide plate. The electrode guide includes a pair of walls that define a track along the upper surface of the guide plate. The separator guide is supported relative to the guide plate such that a passageway is defined along a lower surface of the guide plate. The roller element is supported at a distal end of the guide plate.

The indexing assembly includes an actuatable element and a connector element. The actuatable element is configured to be actuated between a first state and a second state. The connector element is operably attached to each of the actuatable element and guide assembly such that upon actuation of the actuatable element between the first state and second state, the guide assembly is moved between a first configuration and a second configuration.

In some embodiments, the pair of walls includes at least one wall that is movably supported relative to the guide plate. A width of the track is adjustable by moving the wall relative to a width of the guide plate. The separator guide is optionally supported movably relative to the guide plate such that a center axis along which the passageway defined by the separator guide extends may be moved relative to a center axis along which the track defined by the electrode guide extends. In some embodiments, the separator guide includes a base plate and an adjustable plate movably supported relative to the base plate. A width of the passageway is adjustable by moving the adjustable plate relative to the base plate.

In some embodiments, the connector element includes a base portion having a rail, and a moveable portion. The moveable portion includes an attachment structure secured to the actuatable element, and a carriage assembly secured to the guide plate. Upon actuation of the actuatable element, the guide assembly is slidingly moved relative to the rail of the base portion between the first configuration and the second configuration. A restraining element is optionally supported relative to a distal end of the guide plate, and extends above an upper surface of the roller element. The roller element optionally includes a first end that is attached to the guide assembly, and a second free end.

In one implementation of the present disclosure, a method of winding an electrode assembly includes feeding a free end of a separator into a passageway defined by a separator guide. The free end of the separator is secured relative to a winding pin. A free end of an electrode is fed along a track defined by an electrode guide of the guide assembly and is secured relative to the winding pin. Following the securement of the free end of the separator relative to the winding pin, the guide assembly is indexed from a first configuration to a second configuration. In the first configuration, a distal end of the guide assembly is separated from the winding pin by a first distance. In the second position, the distal end of the guide assembly is separated from the winding pin by a second distance that is less than the first distance. In various embodiments, a free end of the separator is fed over the top of a roller element supported at a distal end of the guide assembly. The free end of the electrode is optionally secured relative to the winding pin following the indexing of the guide assembly to the second configuration. The guide assembly is in the second configuration while the winding pin is rotated to coil the electrode and separator into a wound cell assembly.

In some embodiments, a free end of a second separator is fed into a second passageway defined by a separator guide of a second guide assembly. The free end of the second separator is secured relative to the winding pin. Following the securement of the free end of the second separator relative to the winding pin, the second guide assembly is indexed from a first configuration to a second configuration. In the first configuration, a distal end of the second guide assembly is separated from the winding pin by a first distance. In the second position, the distal end of the second guide assembly is separated from the winding pin by a second distance that is less than the first distance.

The foregoing summary is illustrative only and is not intended to be in any way limiting. In addition to the illustrative aspects, embodiments and features described above, further aspects, embodiments and features will become apparent by reference to the following drawings and the detailed description.

DESCRIPTION OF DRAWINGS

FIG. 1 is an illustrative diagram of a winding system, according to one embodiment.

FIG. 8C is a perspective cross-section view of the distal end of the guide assembly of FIG. 8A, taken along line 8C-8C, according to one embodiment.

DESCRIPTION

Figure 2A:
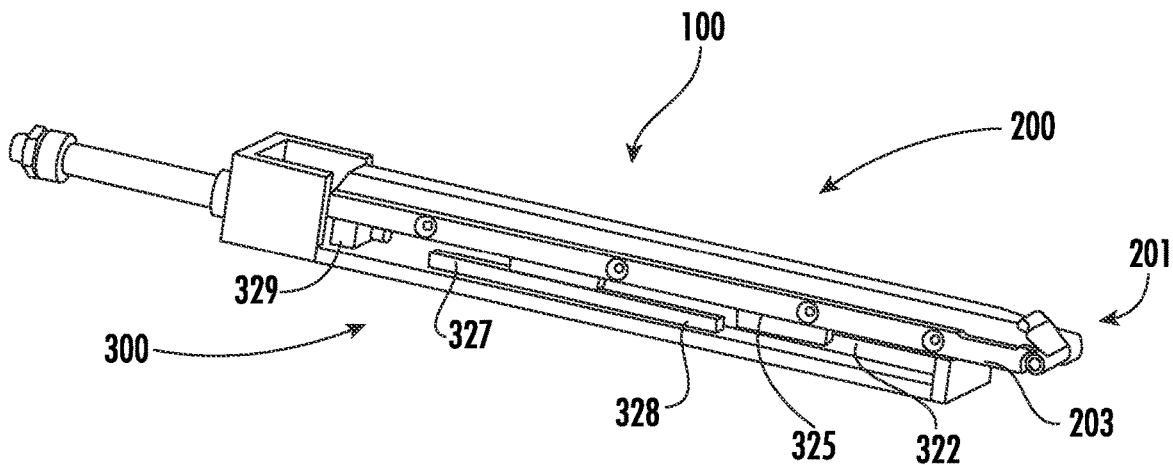
FIG. 2A is perspective view of a feed system including a guide assembly and indexing assembly, with the guide assembly in a first configuration, according to one embodiment.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and may be practiced with any other embodiment(s).

Shown in FIG. 1 is one example embodiment of a winding system 10 configured to coil cathode 21, anode 23, and separator 25 components into a wound cell (e.g., electrode assembly).

In the winding system 10 embodiment of FIG. 1, the winding system 10 generally includes a rotatable winding pin 30, a pair of fixed guide elements 11, and a pair of rotatable, fixed rollers 13 that are supported relative to one another by a housing 40. As also shown in FIG. 1, the housing 40 also supports supplies 22, 24, 26 (e.g. spools) of each of the cathode 21, anode 23, and separator 25 components, respectively, that are fed to the winding pin 30 to form the wound cell.

During operation of the winding system 10 embodiment of FIG. 1 in a coiling mode, the winding pin 30 is rotated such that the cathode 21, anode 23 and separator 25 components are fed towards, and coiled about, the winding pin 30. As cathode 21 from the cathode supply 22 is fed towards the winding pin 30, the cathode 21 is guided along the first fixed guide element 11a. Upon reaching a distal end of the first fixed guide element 11a, the cathode 21 is passed over the first fixed roller 13a, which is supported relative to the housing 40 at a location adjacent the distal end of the first fixed guide element 11a.

The rotation of the winding pin 30 also causes a separator 25 from a first separator supply 26a to concurrently be fed toward the winding pin 30. As the cathode 21 and separator 25 from the first separator supply 26a are passed over the first fixed roller 13a, the cathode 21 and separator 25 are aligned with one another. Upon passing over the first fixed roller 13a, the layered separator 25 and cathode 21 are fed towards and wound about the winding pin 30.

During operation of the winding system 10 in the coiling mode, anode 23 from the anode supply 24 and separator 25 from the second separator supply 26b are similarly fed towards the winding pin 30. Namely, during the coiling mode, anode 23 from the anode supply 24 is guided along the second fixed guide element 11b. Upon reaching a distal end of the second fixed guide element 11b, the anode 23 is passed over the second fixed roller 13b, which is located adjacent the distal end of the second fixed guide element 11b.

The rotation of the winding pin 30 also causes a separator 25 from the second separator supply 26b to concurrently be fed towards the winding pin 30. As the anode 23 and separator 25 from the second separator supply 26b are passed over the second fixed roller 13b, the anode 23 and separator 25 are aligned with one another. Upon passing over the second fixed roller 13b, the layered separator 25 and anode 23 are fed towards and wound about the winding pin 30.

Prior to being able to operate the winding system 10 in the coiling mode, free ends of the separator 25 from each of the first separator supply 26a and the second separator supply 26b are first attached (e.g., threaded) about the winding pin 30. This attachment of the free ends of the separator 25 from each of the first separator supply 26a and second separator supply 26b during an initial set-up of the winding system 10 typically requires sufficient clearance between the fixed rollers 13 and the winding pin 30 for a user and/or attachment mechanism (e.g., pinch rolls 50) to access the winding pin 30.

Given the fixed attachment of the fixed rollers 13 and the fixed guide elements 11 relative to the housing 40 in the embodiment of the winding system 10 illustrated in FIG. 1, the minimum spacing between each fixed roller 13 and the winding pin 30 is thus limited by the clearance required by a user and/or attachment mechanism (e.g. pinch rolls 50) for winding pin 30 capture during the set-up of the winding system 10. For example, as shown by the dashed lines in FIG. 1, the fixed rollers 13 must be spaced from the winding pin 30 by a distance that is at least as great as a width of a pinch roll 50 used to facilitate the attachment of the separator 25 during the set-up of the winding system 10.

Figure 2B:
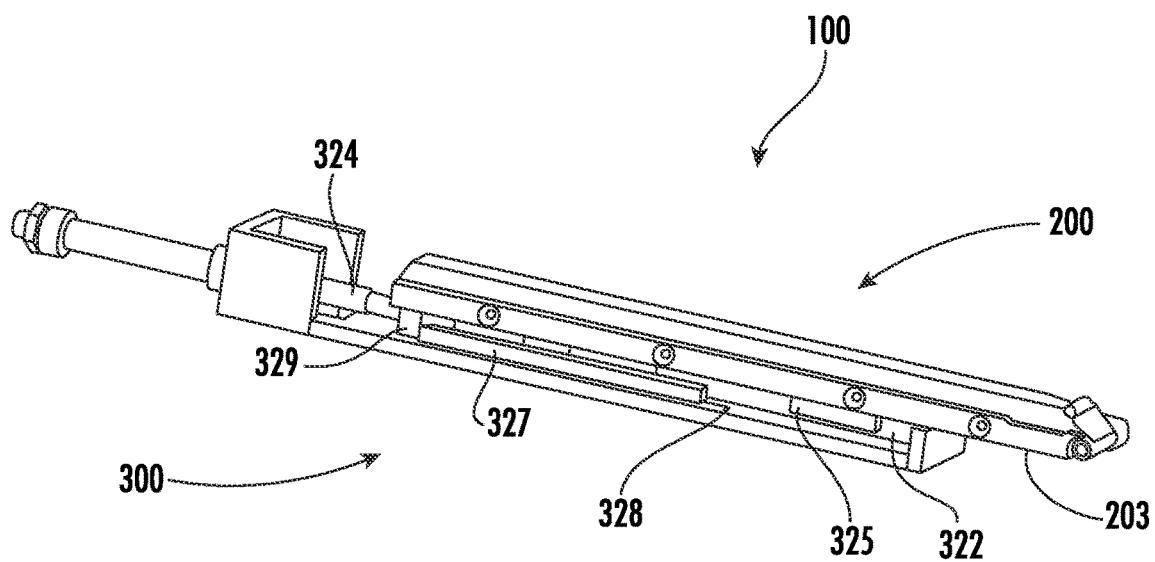
FIG. 2B is perspective view of the feed system of FIG. 2A with the guide assembly in a second configuration, according to one embodiment.
Figure 3:
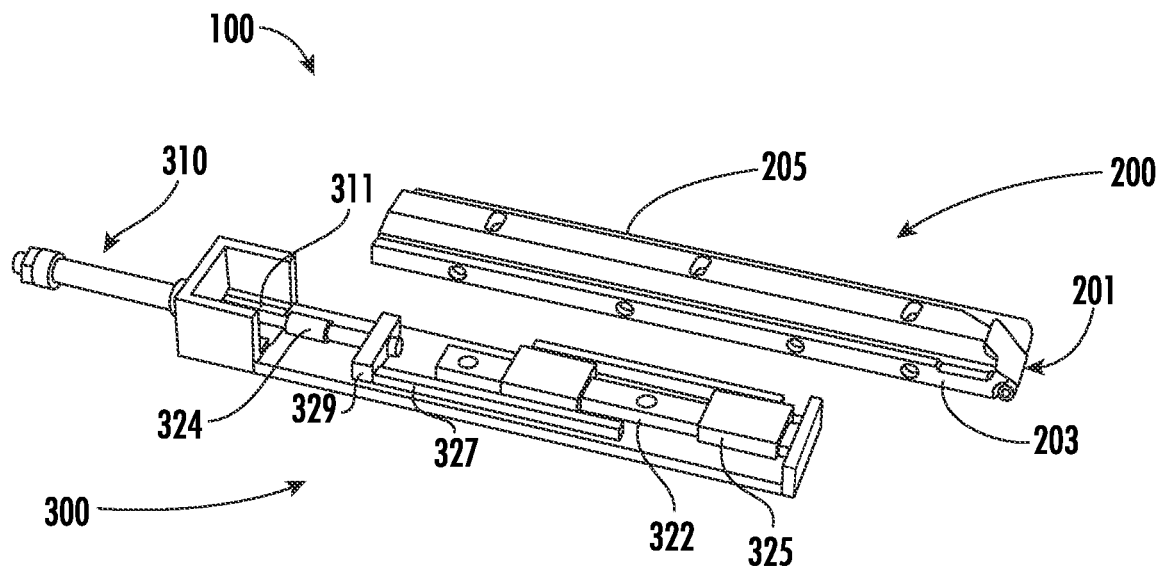
FIG. 3 is an exploded view illustrating the guide assembly and indexing assembly of the feed system of FIG. 2A, according to one embodiment.

Given the arrangement of the fixed rollers 13 at a location between the winding pin 30 and the distal ends of the fixed guide elements 11, the required minimum spacing between each fixed roller 13 and winding pin 30 also affects the minimum distance D1 by which the distal end of each fixed guide element 11 may be separated from the winding pin 30. For example, according to some embodiments, the minimum distance D1 by which the distal end of each fixed guide element 11 is separated from the winding pin 30 is between approximately 28 mm and 32 mm, Referring generally to FIGS. 2A-12C, a feed system 100 that improves the precision with which an electrode 27 (i.e. an anode 23 or cathode 21) and separator 25 are aligned relative to one another—and which minimizes the risk of deviation from the desired aligned arrangement as the electrode 27 and separator 25 are fed towards the winding pin 30—for a winding system 10 is described according to various embodiments. As shown in FIG. 3, the feed system 100 generally includes an integrated guide assembly 200 that guides and aligns the electrode 27 and separator 25 in a desired arrangement relative to one another, and an indexing assembly 300 that indexes the guide assembly 200 between a first configuration (e.g., such as shown in FIG. 2A) and a second configuration (e.g., such as shown in FIG. 2B).

As will be described in more detail below, the replacement of the fixed guide element 11 and fixed roller 13 components of the winding system 10 embodiment of FIG. 1 with a feed system 100 as described herein advantageously increases the precision and accuracy of electrode 27 (i.e. cathode 21 or anode 23) and separator 25 alignment during operation of the winding system 10. Accordingly, the feed system 100 improves cell safety and efficacy with minimal (e.g., no) reliance on the adjustment cathode 21, anode 23 and/or separator 25 widths to achieve a desired cell winding tolerance.

Figure 4:
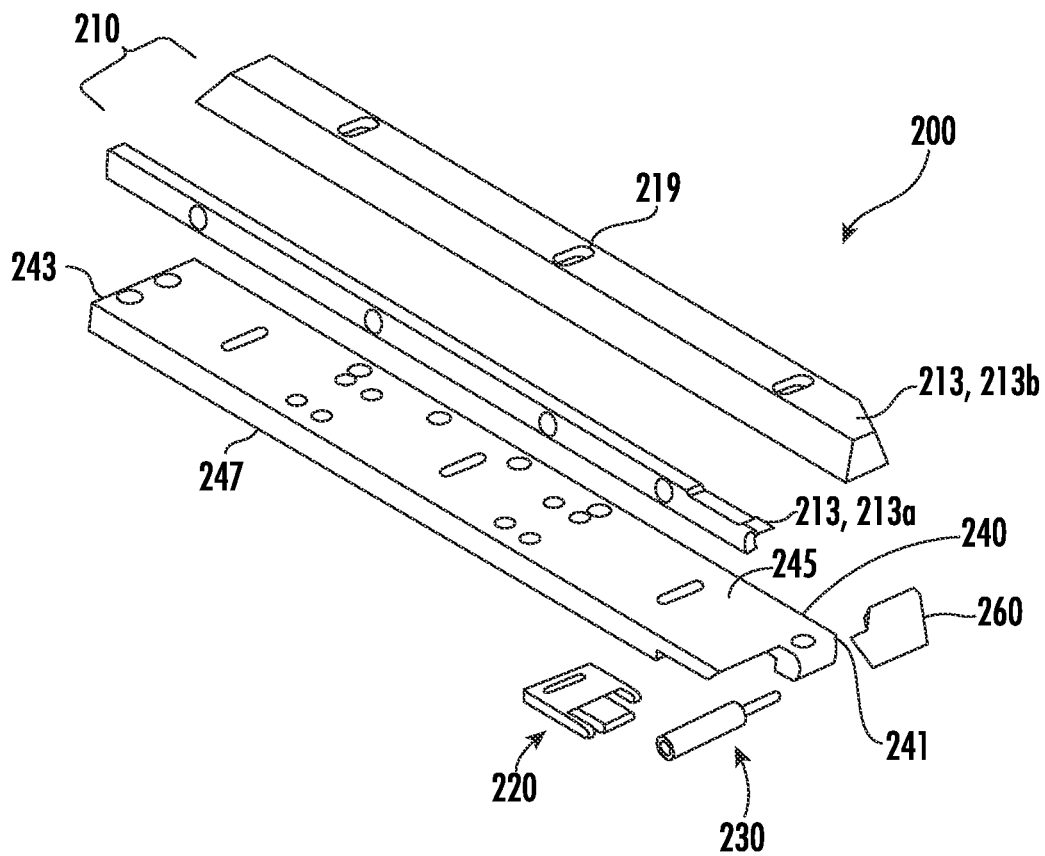
FIG. 4 is an exploded view of the guide assembly of FIG. 3, according to one embodiment.

Turning to FIG. 4, the integrated guide assembly 200 generally includes an electrode guide 210, a separator guide 220 and a roller element 230 that are each attached to and supported by a guide plate 240. The guide assembly 200 also optionally includes a restraining element 260 supported relative to a distal end 241 of the guide plate 240. As will be described in more detail below, the integrated arrangement of the electrode guide 210, separator guide 220 and roller element 230 components of the guide assembly 200 relative to one another advantageously increases the accuracy and precision with which electrode 27 and separator 25 are fed to, and wound about, the winding pin 30 during the operation of the winding system 10 in the coiling mode.

Figure 5A:
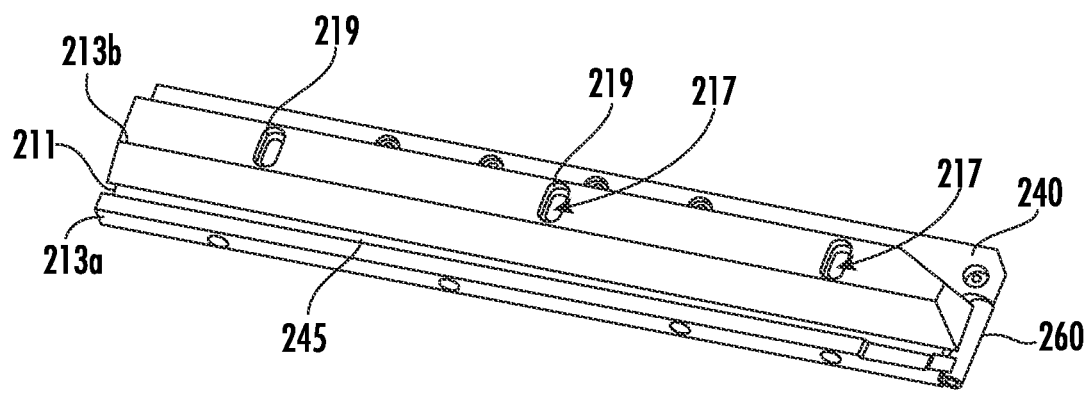
FIG. 5A is a perspective view of the electrode guide of the guide assembly of FIG. 4 in a first configuration, according to one embodiment.
Figure 5B:
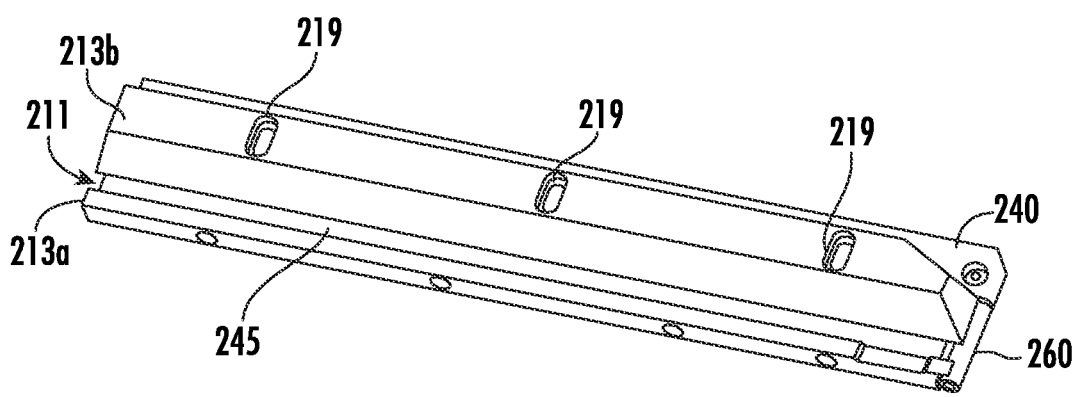
FIG. 5B is a perspective view of the electrode guide of FIG. 5A in a second configuration, according to one embodiment.

As shown in FIGS. 5A and 5B, the electrode guide 210 defines a linear track 211 along an upper surface 245 of the guide plate 240. The track 211 generally extends between a location at, or adjacent, a proximal end 243 of the guide plate 240, and the distal end 241 of the guide plate 240. Electrode 27 from an electrode supply 28 (e.g., cathode supply 22 or anode supply 24, etc.) is fed into a proximal end 243 of the track 211, and is guided by the track 211 in a desired alignment relative to the winding pin 30 until the electrode 27 exits out from the distal end 241 of the track 211. Alternatively, electrode 27 may be manually fed into and guided along the track 211 by a user.

The electrode guide 210 may include and/or be defined by any variety of structures and arrangements. For example, as illustrated by the guide assembly 200 embodiment of FIGS. 5A and 5B, the electrode guide 210 optionally includes a pair of parallel walls 213 (e.g., a first wall and a second wall) that are laterally offset relative to one another, and which extend upwards relative to an upper surface 245 of the guide plate 240. The track 211 is defined by an upper surface 245 of a portion of the guide plate 240 extending between the parallel walls 213. In other embodiments (not shown), the track 211 of the electrode guide 210 may be defined by an elongated recess integrally defined in the upper surface 245 of the guide plate 240.

A width of the track 211 is dimensioned to be slightly greater than a width of the electrode 27, such that the electrode 27 may slide freely along the track 211 as it is guided towards the winding pin 30. In various embodiments, the electrode guide 210 may optionally be configured to allow the width of the linear track 211 to be varied to accommodate electrodes 27 of different widths. For example, as illustrated by the guide assembly 200 embodiment of FIGS. 5A and 5B, the pair of parallel walls 213 defining the electrode guide 210 may include an edge wall 213a that is immovably fixed relative to the guide plate 240, and an adjustable wall 213b that is movably attached relative to a width of the guide plate 240 (e.g., via screws 217 inserted into elongated slots 219 that extend perpendicularly relative to the length of the guide plate 240).

Figure 6A:
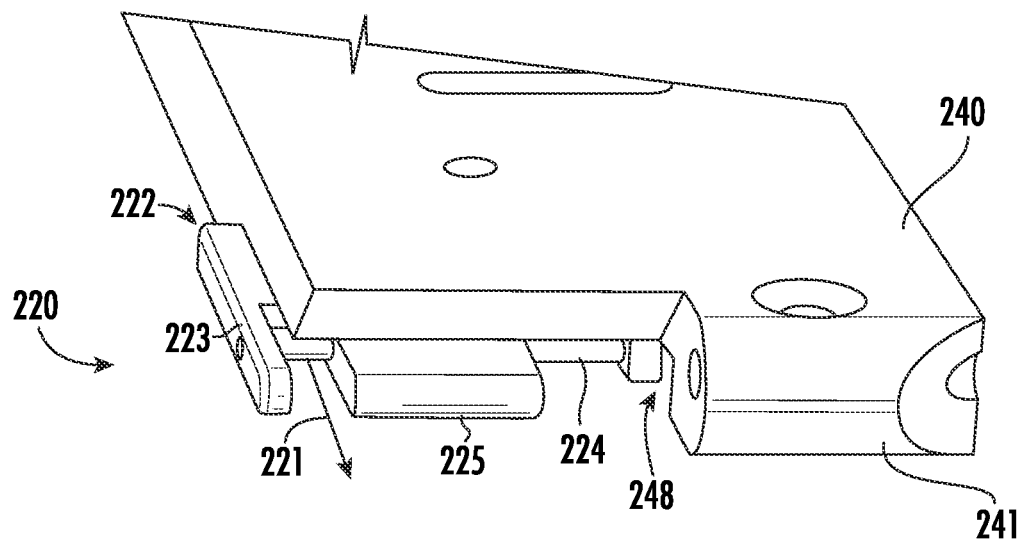
FIG. 6A is a top perspective view of the separator guide and distal end of the guide plate of the guide assembly of FIG. 3, according to one embodiment.
Figure 6B:
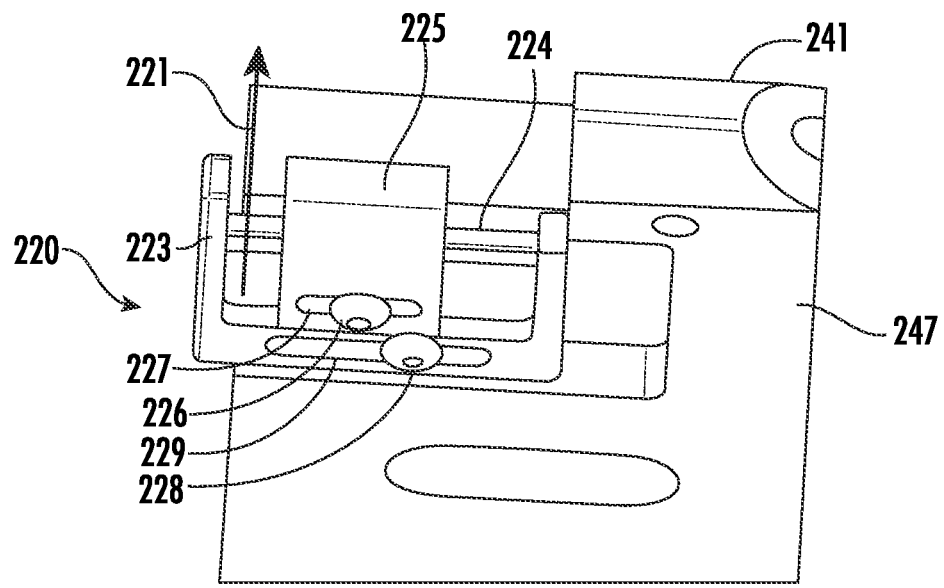
FIG. 6B is a bottom perspective view of the separator guide and guide plate of FIG. 6A, according to one embodiment.

Turning to FIGS. 6A and 6B, the separator guide 220 defines a passageway 221 through which the separator 25 passes as it is fed towards the winding pin 30. The separator guide 220 is arranged/defined relative to the lower surface 247 of the guide plate 240 such that a central axis along which the passageway 221 extends is positioned in a desired alignment relative to a central axis along which the track 211 defined by the electrode guide 210 extends. As will be described in more detail below, in addition to facilitating the alignment of the separator 25 relative to the electrode 27 during operation of the winding system 10 in a coiling mode, the separator guide 220 is additionally configured to allow the guide assembly 200 to move backward and forward relative to the separator 25 while precisely maintaining the separator 25 alignment relative to the electrode 27 during the initial set-up of the winding system 10, as well as during the cutting of the separator 25 that occurs following the completion of a first wind and prior to the set-up of the winding system 10 for a second wind).

The separator guide 220 may include and/or be defined by a variety of structures and arrangements. For example, as illustrated by the guide assembly 200 embodiment of FIGS. 6A and 6B, the separator guide 220 optionally comprises a base plate 222 that defines, or supports, a downwardly extending arm 223 and a downwardly extending plate 225 relative to one another in a laterally offset arrangement. As shown in FIGS. 6A and 6B, the base plate 222 is supported relative to a lower surface 247 of the guide plate 240 (e.g., within an optional recess 248 formed along the lower surface 247 of the guide plate 240). Upon attachment of the base plate 222 to the guide plate 240, the lateral offset between the arm 223 and plate 225 defines the passageway 221 of the separator guide 220.

Figure 7A:
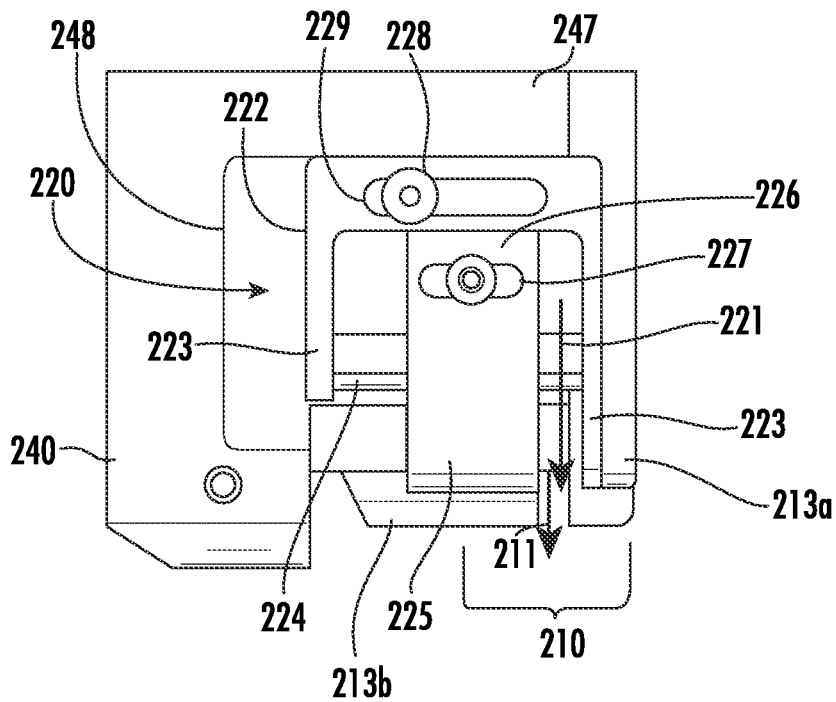
FIG. 7A is a bottom view of the separator guide of the guide assembly of FIG. 3 in a first configuration, according to one embodiment.
Figure 7B:
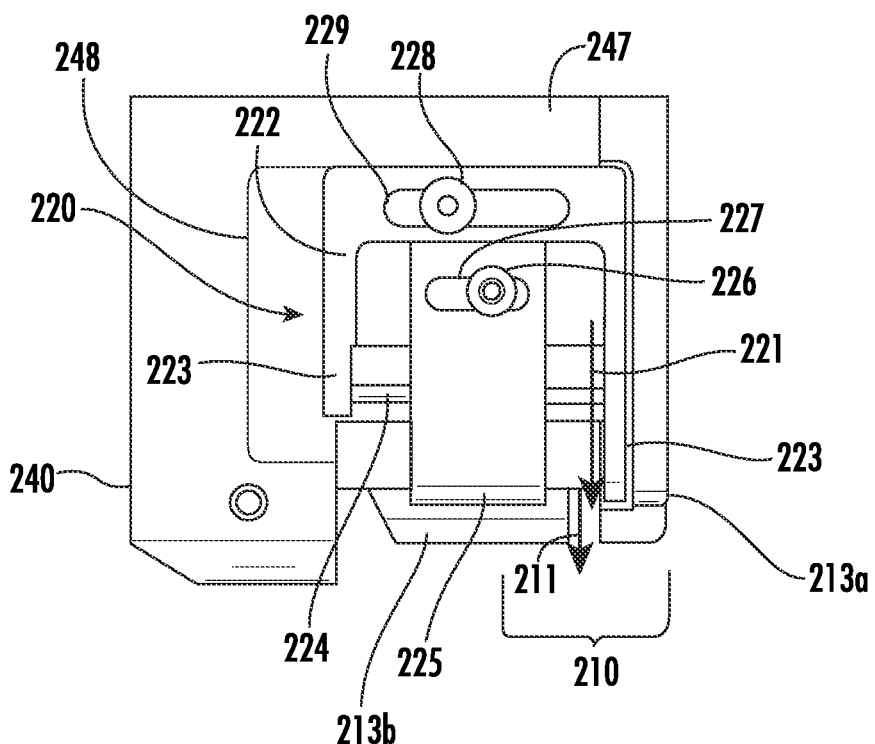
FIG. 7B is a bottom view of the separator guide FIG. 7A in a second configuration, according to one embodiment.

A width of the passageway 221 defined by the separator guide 220 is dimensioned to be slightly greater than a width of the separator 25, such that the separator 25 may slide freely therethrough as it is fed towards the winding pin 30. According to some embodiments, the separator guide 220 is configured to allow the width of the passageway 221 to be varied to accommodate separators 25 of different widths. As such, one or both of the plate 225 and arm 223 are optionally moveably supported by the base plate 222, such that the lateral offset (and passageway 221 defined thereby) between the plate 225 and arm 223 may be varied as needed. For example, as illustrated by FIGS. 7A and 7B, the plate 225 is optionally slidably supported relative to the base plate 222 along a pin 224 that extends across of width of the base plate 222, which allows the plate to be moved relative to the arm 223 responsive to the movement of a screw 226 within an elongated slot 227 that extends perpendicularly relative to the base plate 222.

In other embodiment, the separator guide 220 may include and/or be defined by a variety of structures and arrangements. For example, the passageway 221 of the separator guide 220 may be defined by an elongated recess integrally defined in the lower surface 247 of the guide plate 240. Alternatively, the separator guide 220 may include a pair of laterally offset walls that are attached to, and extend downwards relative to the lower surface 247. One or both of the walls are optionally moveable in a lateral direction relative to a width of the lower surface 247 of the guide plate 240 (e.g., in a manner similar to that described with reference to adjustable wall 213b), thus allowing a width of the passageway 221 and/or an arrangement of the axis of the passageway 221 relative to the axis of the track 211 to be varied.

During operation of the winding system 10, it may be desired to vary the alignment of the widths of the electrode 27 and separator 25 relative to one another. Accordingly, the guide assembly 200 may optionally allow one or both of a central axis along which the track 211 defined by the electrode guide 210 extends and a central axis along which the passageway 221 defined by the separator guide 220 extends to be moved relative to a width of the guide plate 240. For example, as illustrated by FIGS. 7A and 7B, the base plate 222 (and pin 224 supported thereby) may optionally be movably attached relative to a width of the guide plate 240 (e.g., via a screw 228 inserted into an elongated slot 229 that extends perpendicularly relative to the length of the guide plate 240). As another example, in electrode guide 210 embodiments comprising a pair of parallel walls 213 (such as, e.g., representatively illustrated by the embodiment of FIGS. 5A and 5B), each of the pair of walls 213 may optionally comprise an adjustable wall 213b that is movably attached relative to a width of the guide plate 240.

Figure 8A:
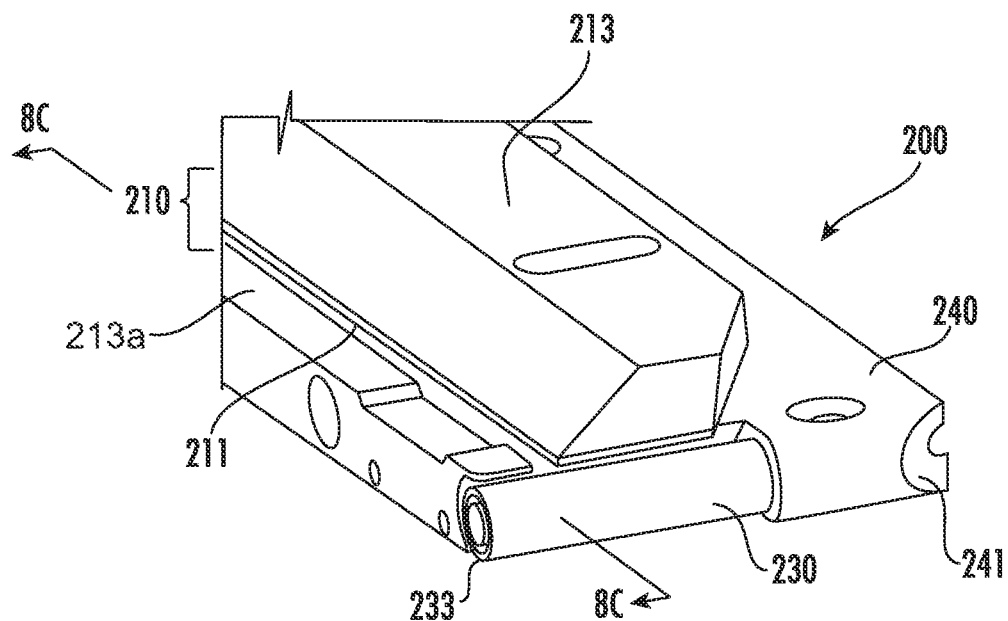
FIG. 8A is a top perspective view of the distal end of the guide assembly of FIG. 3, according to one embodiment.
Figure 8B:
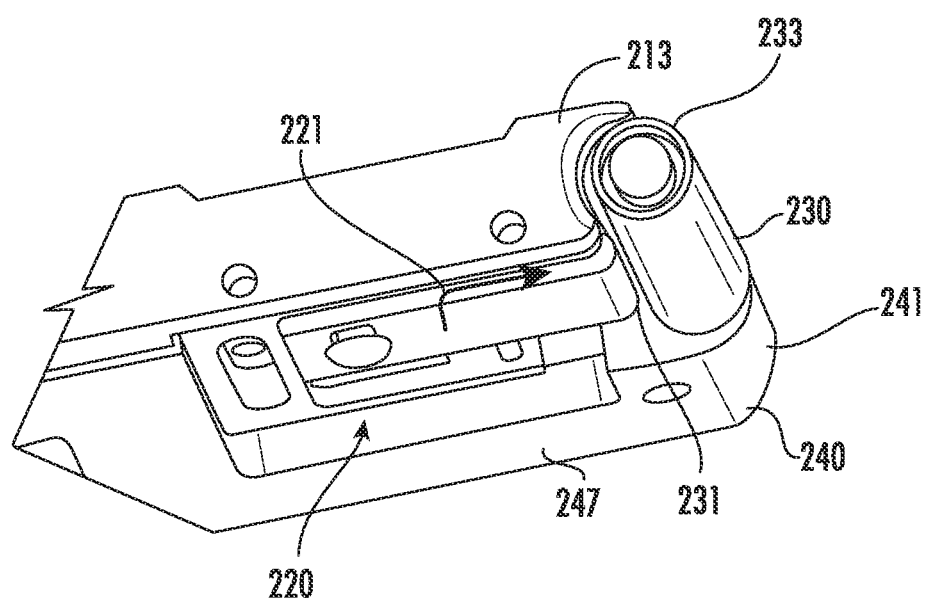
FIG. 8B is a bottom perspective view of the distal end of the guide assembly of FIG. 8A, according to one embodiment.

Referring to FIGS. 8A and 8B, located at, and supported relative to, a distal end 241 of the guide plate 240 is a roller element 230. As shown in FIG. 8C, during the coiling of the wound cell, electrode 27 exiting the track 211 and separator 25 exiting passageway 221 are each pulled over a top of the roller element 230 to form an aligned, layered arrangement that is fed to the winding pin 30. As will be described in more detail below, in addition to facilitating the alignment of the separator 25 relative to the electrode 27 during operation of the winding system 10 in a coiling mode, the roller element 230 is additionally configured to allow the guide assembly 200 to move backward and forward relative to the separator 25 while precisely maintaining the separator 25 alignment relative to the electrode 27 during the initial set-up of the winding system 10.

As illustrated by FIGS. 8A and 8B, to facilitate winding pin 30 capture during the initial set-up of the winding system 10, the roller element 230 is optionally mounted relative to the guide plate 240 in a cantilevered arrangement. In such arrangements, a slot 231 defined between a distal end 241 of the guide plate 240 and the unattached, free end 233 of the roller element 230 facilitates the threading of a free end of the separator 25 exiting the passageway 221 of the separator guide 220 over a top of the roller element 230.

Figure 9A:
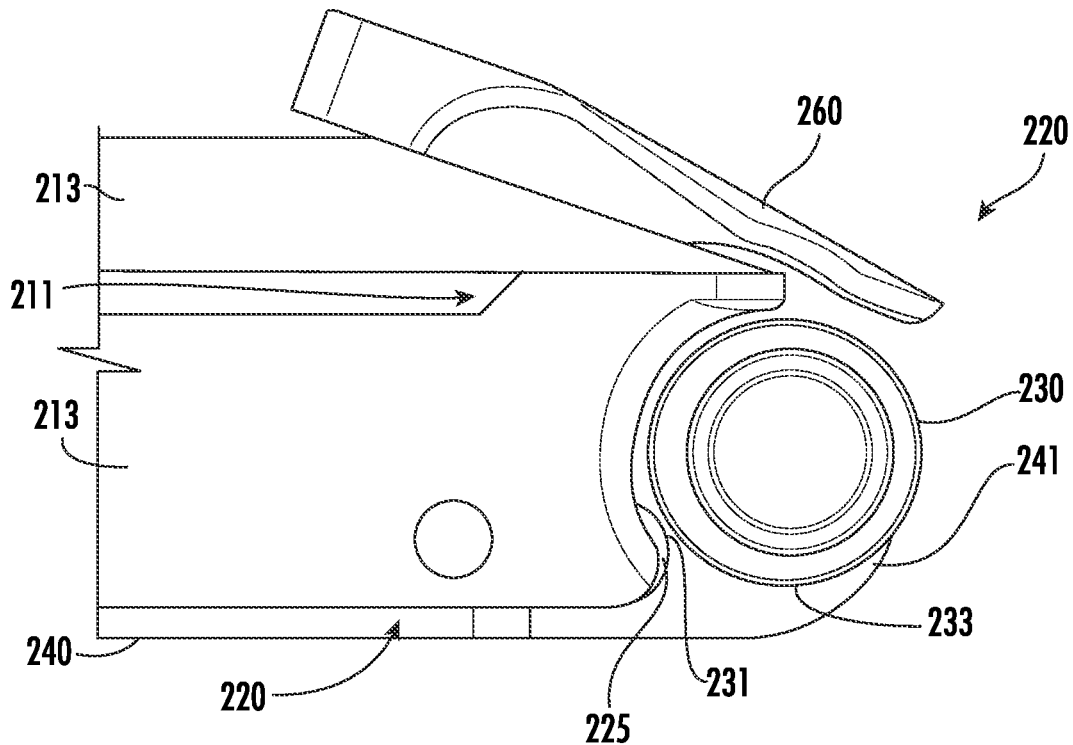
FIG. 9A is a side view of the distal end of the guide assembly of FIG. 3, according to one embodiment.

As shown in FIG. 9A, the guide assembly 200 optionally includes restraining element 260. The restraining element 260 is positioned above an upper surface 245 of the distal end 241 of the guide plate 240 and roller element 230 to reduce the risk of undesired vertical and/or lateral movement of the electrode 27 exiting the track 211 and/or the layered electrode 27 and separator 25 exiting the roller element 230.

Figure 9B:
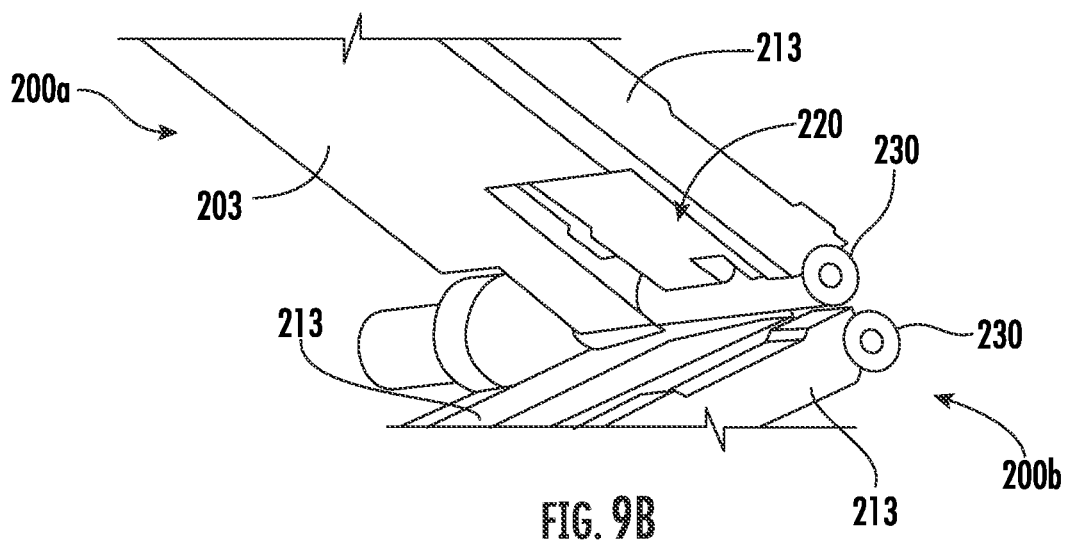
FIG. 9B is a partial view of an arrangement of an upper guide assembly and lower guide assembly, according to one embodiment.
Figure 11A:
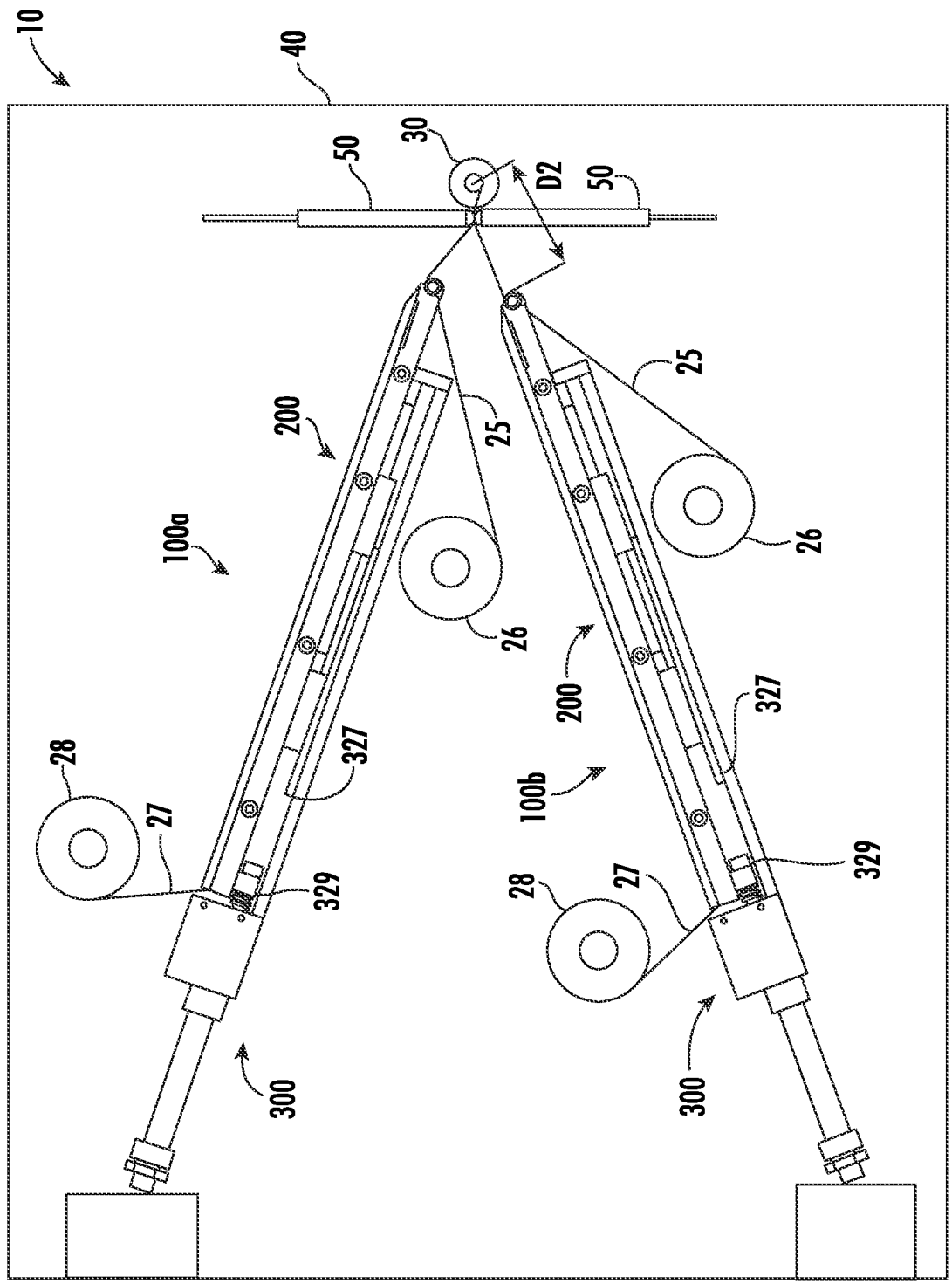
FIG. 11A is an illustrative diagram of a winding system including a pair of guide assemblies in a first configuration, according to one embodiment.

In embodiments in which the winding system 10 includes a pair of feed systems 100 (e.g., a first, upper feed system 100a for one of a cathode 21 and anode 23, and a second, lower feed system 100b for the other or a cathode 21 and anode 23), each of the guide assemblies 200 optionally includes a restraining element 260. Alternatively, as illustrated by FIGS. 9B and 11A, the pair of feed systems 100 are optionally mounted relative to one another at an angle, with a lower surface 203 of the distal end 201 of the upper, first guide assembly 200a being arranged adjacent an upper surface 205 of the distal end 201 of the lower, second guide assembly 200b, such that the upper guide assembly 200a functions similarly to the restraining element 260 in restricting vertical and/or lateral movement of the electrode 27 and separator 25 being fed through the lower guide assembly 200b.

Figure 10:
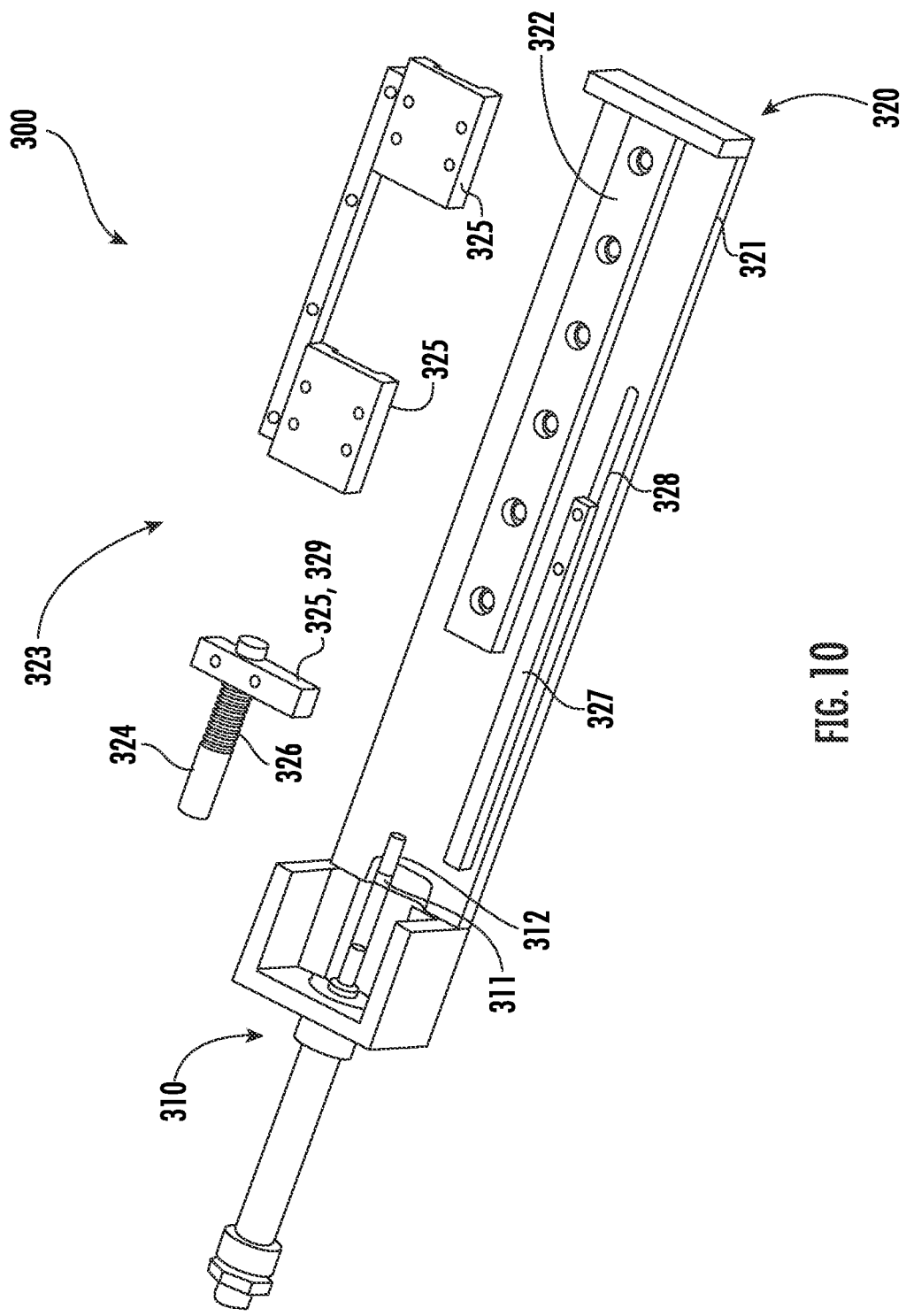
FIG. 10 is an exploded view of the guide assembly of FIG. 3, according to one embodiment.
Figure 11B:
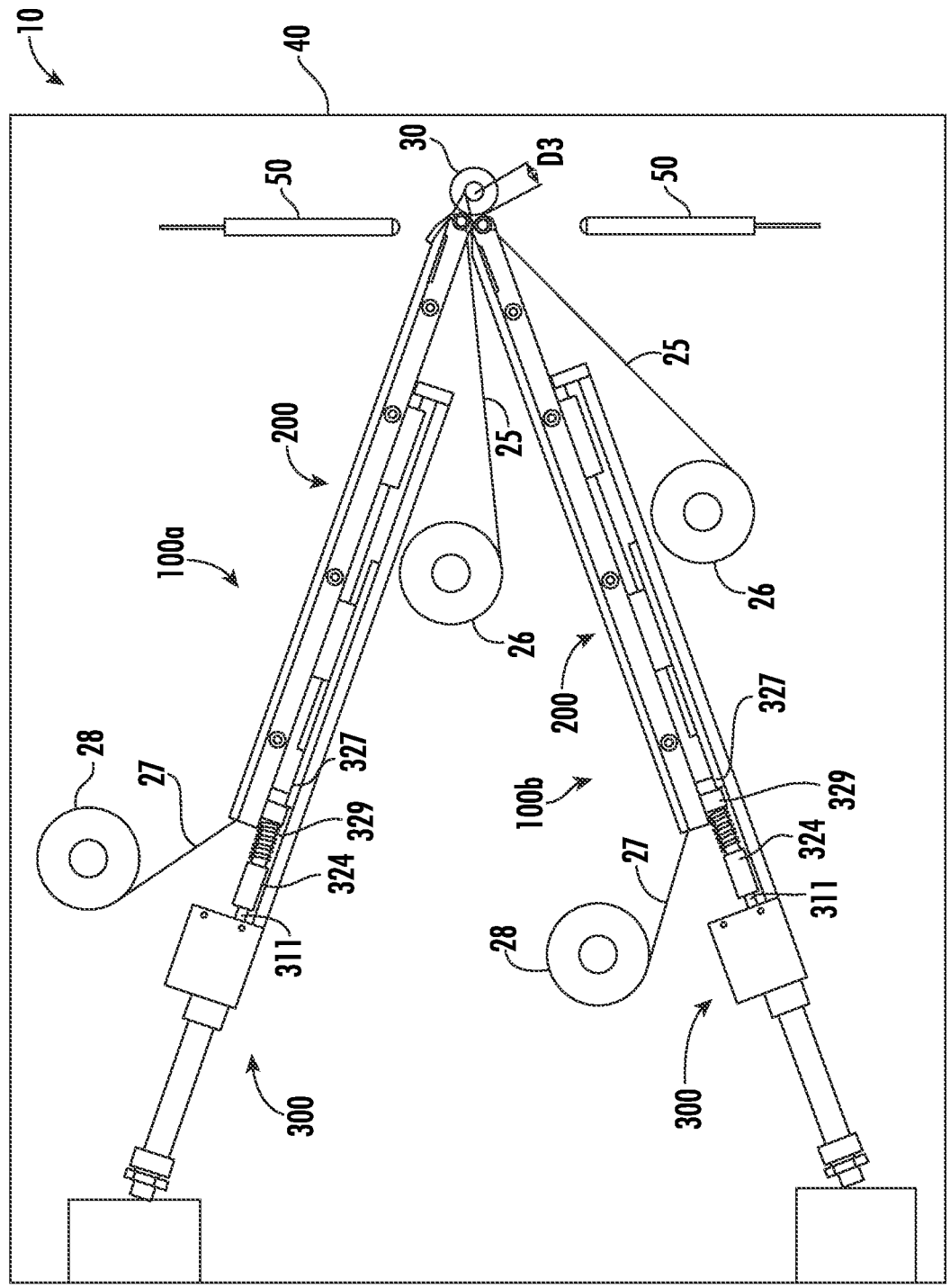
FIG. 11B is an illustrative diagram the winding system of FIG. 11A with the guide assemblies in a second configuration, according to one embodiment.

Turning to FIG. 10, an indexing assembly 300 of the feed system 100 is shown according to one embodiment. The indexing assembly 300 is generally operably connected to the guide assembly 200, so as to allow the distal end 201 of the guide assembly 200 to be moved between a first guide assembly 200 configuration (see, e.g., FIG. 11A) and a second guide assembly 200 configuration (see, e.g., FIG. 11B). As illustrated by FIGS. 11A and 11B, a distance D2 between the distal end 201 of the guide assembly 200 and the winding pin 30 is greater in the first guide assembly 200 configuration than a distance D3 between the distal end 201 of the guide assembly 200 and the winding pin 30 when the guide assembly 200 is in the second guide assembly 200 configuration.

The indexing assembly 300 generally includes an actuatable element 310 and a connector element 320. The actuatable element 310 may comprise any number of different components configured to move in a linear and/or rotational direction between a first configuration and a second configuration in response to being actuated by an actuator (not shown). For example, as illustrated by the feed system 100 embodiment of FIG. 10, the actuatable element 310 optionally comprises a pneumatic cylinder 311 that is retractable in a linear direction between a first configuration and a second configuration.

The connector element 320 operably connects the guide assembly 200 and the actuatable element 310, and thereby acts to transfer movement of the actuatable element 310 to the guide assembly 200 to effectuate a transition of (e.g., an extension of, a pivoting rotation of, etc.) the guide assembly 200 between the first guide assembly 200 configuration (see, e.g., FIG. 11A) and the second guide assembly 200 configuration (see, e.g., FIG. 11B). The connector element 320 may be defined by a variety of structures and arrangements. For example, the connector element 320 may be defined having a unitary, fixed structure, such that actuation of the actuatable element 310 results in a movement of the entirety of the feed system 100 relative to the winding pin 30.

Alternatively, as representatively illustrated by the feed assembly embodiment of FIG. 10, the connector element 320 may comprise a multi-piece structure comprising a base portion 321 having a guide element (e.g. a rail 322) that remains stationary during actuation of the actuatable element 310, and a moveable portion 323 that undergoes movement during actuation of the actuatable element 310.

As shown in FIG. 10, the moveable portion 323 includes a first attachment structure (e.g., a cylinder 324 having a threaded bore that receives a threaded end 312 of a pneumatic cylinder 311) that fixedly secures the moveable portion 323 relative to the actuatable element 310. The moveable portion 323 also includes a second attachment structure (e.g., one or more carriage elements 325) that is configured to be fixedly secured relative to the guide plate 240, and to be moveably (e.g. slidingly) secured relative to the guide element (e.g. rail 322) of the base portion 321. Thus, upon actuation of the actuatable element 310, movement of the actuatable element 310 is transferred to the moveable portion 323 via the first attachment structure (e.g., internally threaded cylinder 324), which causes a movement of the second attachment structure (e.g., carriage elements 325 secured relative to the lower surface 247 of the guide plate 240) of the moveable portion 323 (and guide assembly 200 secured thereto) to be moved along the guide element (e.g., rail 322) of the base portion 321 between a first configuration (see, e.g., FIG. 11A) and a second, different configuration (see, e.g., FIG. 11B). A low force spring 326 is optionally positioned between the actuatable element 310 and the moveable portion 323 to reduce the risk of damage or harm in the event of that a path of the guide assembly 200 is obstructed as the guide assembly 200 transitions between the first and second configurations.

The ability of the indexing assembly 300 to vary the position of the distal end 201 of the guide assembly 200 relative to the winding pin 30, and the ability of the separator guide 220 and roller element 230 to maintain a desired alignment of the separator 25 relative to the electrode 27 during indexing of the guide assembly 200 between different guide assembly 200 configurations (e.g., as shown in FIGS. 11A and 11B) advantageously allows the distance D2 defined between distal end 201 of the guide assembly 200 and the winding pin 30 during initial set-up of the winding system 10 to be independent of the distance D3 defined between the distal end 201 of the guide assembly 200 and winding pin 30 during operation of the winding system 10 in the coiling mode. Accordingly, the feed system 100 embodiments described herein and with reference to FIGS. 2A-12C advantageously allow the guide assembly 200 to be offset from the winding pin 30 by a first distance D2 to provide a requisite clearance for winding pin capture (e.g., between approximately 28 mm and 32 mm), while allowing the offset between the guide assembly 200 and winding pin 30 to be varied to a second distance D3 during operation of the winding system 10 in the coiling mode. This ability to vary the distance between the winding pin 30 and guide assembly 200 from a first distance D2 to a second distance D3 advantageously allows a distance between the distal end 201 of the guide assembly 200 and the winding pin 30 to be minimized during operation of the winding system 10 in the coil mode, thereby increasing the accuracy and precision with which the electrode 27 and separator 25 are fed to the winding pin 30 during operation of the winding system 10.

The distance D3 between the distal end 201 of the guide assembly 200 and the winding pin 30 generally corresponds to a desired radius of the wound cell that is to be formed using the winding system 10. For example, a distance D3 may correspond to a distance of approximately 11 mm or less. The indexing assembly 300 is optionally configured such that a distance travelled by the guide assembly 200 as it transitions between the first guide assembly 200 configuration and second guide assembly 200 configuration may be selectively varied, thereby allowing the distance D3 between the guide assembly 200 and winding pin 30 to be adjusted. This advantageously allows the winding system 10 to be used to form wound coils of varying diameters, without compromising the ability of the guide assembly 200 to be positioned in close proximity to the winding pin 30 (i.e., positioned at a distance D3 corresponding to the desired radius of the wound coil that is to be formed) during operation of the winding system 10 in the coiling mode.

For example, as shown in FIG. 10, the indexing assembly 300 optionally includes a stop 327 that is adjustable relative to a length of the base portion 321 of the connector element 320 (e.g. via a sliding of the stop 327 along adjustment slot 328 formed in the base portion 321). An abutment flange 329 (e.g., a proximal-most carriage element 325 defining the second attachment structure) dimensioned to engage a proximal end of the stop 327 extends radially outwards from the first attachment structure (e.g., internally threaded cylinder 324) of the moveable portion 323. As shown in FIG. 11B, during the transition of the guide assembly 200 between the first configuration and second configuration, an engagement between the abutment flange 329 and the proximal end of the stop 327 limits further movement of the guide assembly 200 in a direction towards the winding pin 30. Accordingly, by varying the arrangement of the stop 327 relative to the length of the base portion 321, the distance travelled by the guide assembly 200 may be selectively adjusted to minimize the distance D3 defined between the guide assembly 200 and winding pin 30 upon transition of the guide assembly 200 to the second configuration.

Figure 12A:
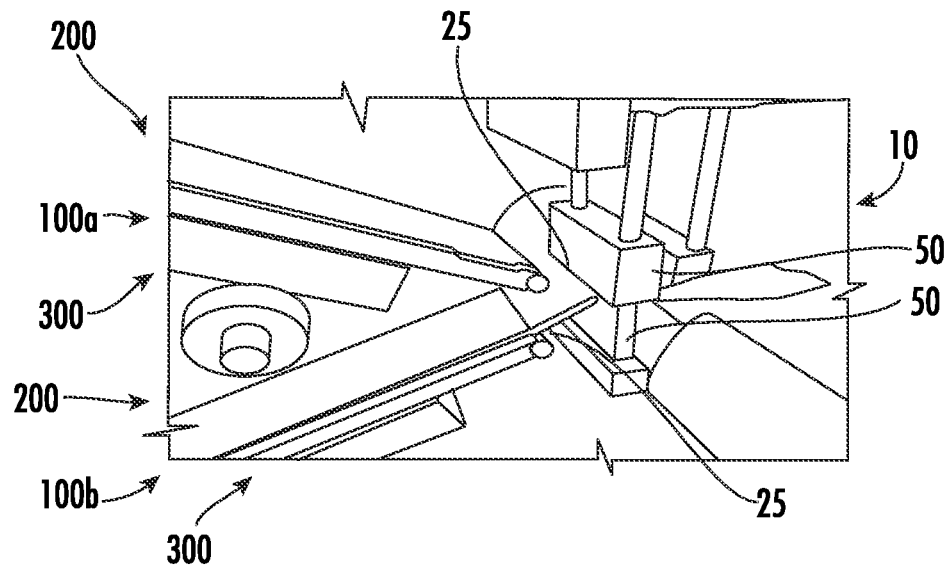
FIGS. 12A-12C illustrate the winding capture of separator and electrode during various stages of an initial set-up of a winding system, according to one embodiment.

Turning to FIG. 12A, an initial set-up of a winding system 10 having a first feed system 100a and second feed system 100b in preparation for operation of the winding system 10 in a coiling mode is shown according to one embodiment. As illustrated by FIG. 12A, during an initial phase of the set-up of the winding system 10, each guide assembly 200 is in the first configuration, in which each guide assembly 200 is separated from the winding pin 30 by a distance D2 that provides sufficient access to the winding pin 30, such that the free ends of separator 25 from each of the first separator supply 26a and second separator supply 26b that have been fed into the passageways 221 and over the roller elements 230 (facilitated e.g., by the optional slot 231 of each guide assembly 200) can be attached about the winding pin 30 (e.g., with the assistance of a pinch roll 50 and/or other mechanism).

Figure 12B:
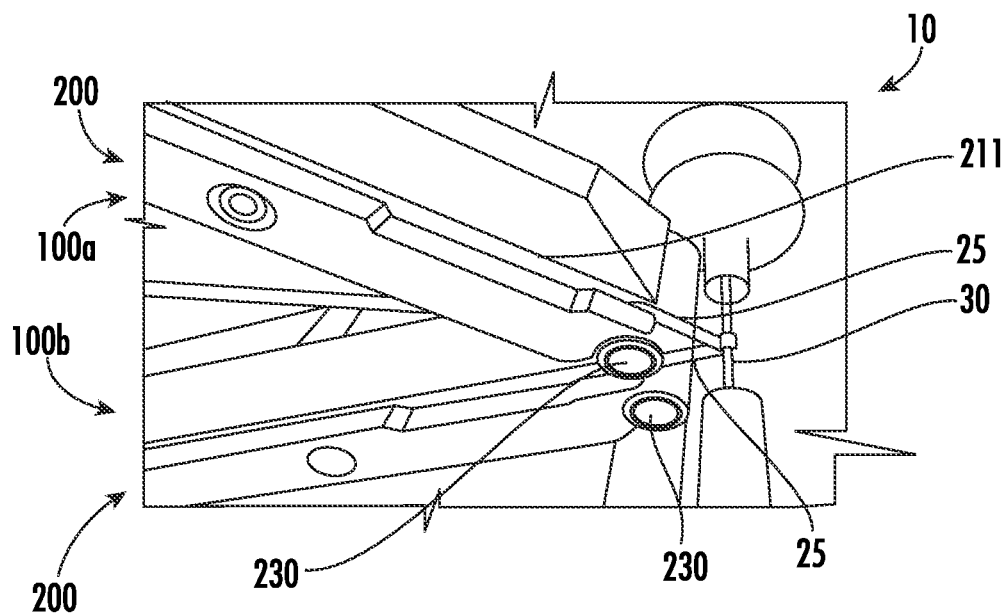

As representatively illustrated in FIG. 12B, during a second phase of the set-up of the winding system 10, once a free end of separator 25 from each of a first separator supply 26a and from a second separator supply 26b has been captured about the winding pin 30, the actuatable element 310 of each indexing assembly 300 is optionally actuated to effectuate a movement of each guide assembly 200 to the second guide assembly 200 configuration.

Figure 12C:
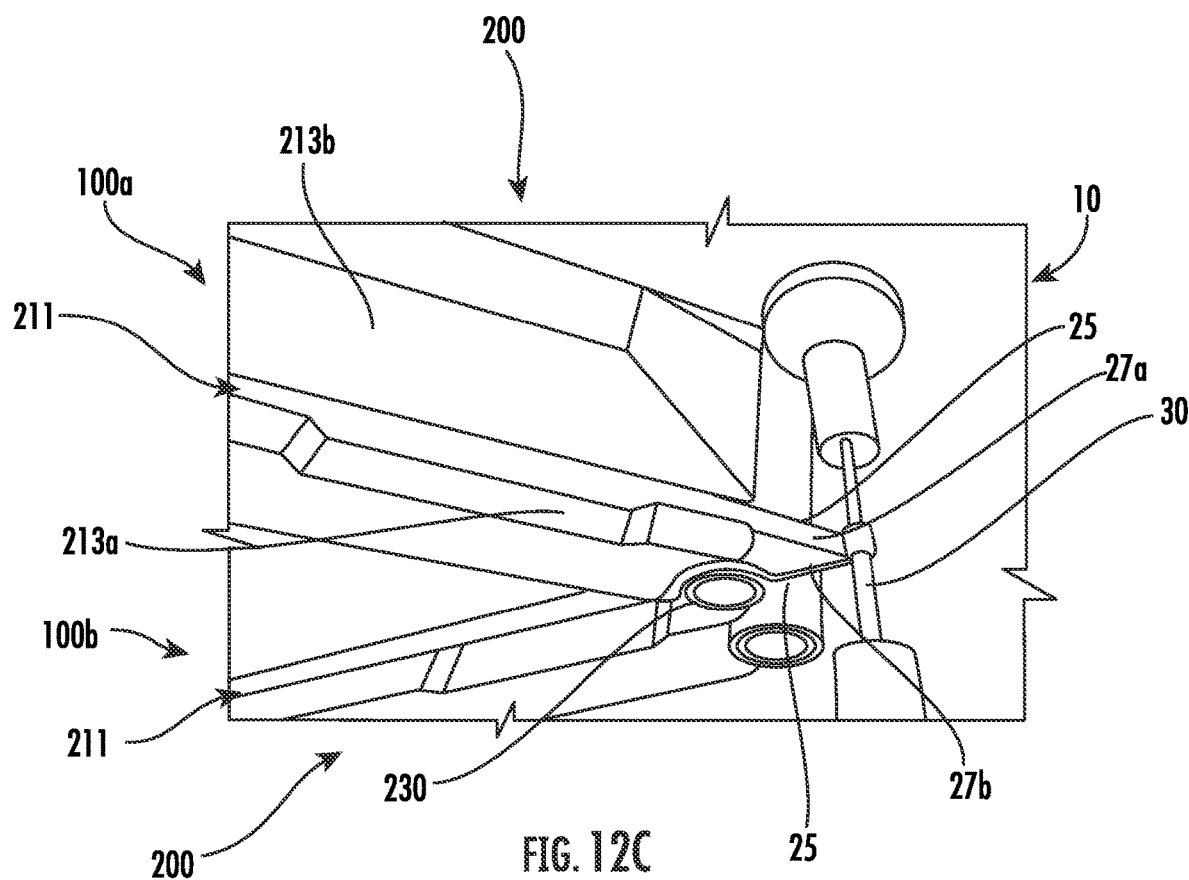

As shown in FIG. 12C, the initial set-up of the winding system 10 continues with a feeding of the first electrode 27a (i.e., one of the cathode 21 and anode 23) into and along a track 211 of the upper guide assembly 200a until it reaches the winding pin 30. The free end of the first electrode 27a is fed into a gap defined between adjacent wound layers of a separator 25 that has been coiled about and captured by the winding pin 30. The winding pin 30 is then rotated to finalize the capture the first electrode 27a.

A second electrode 27b (i.e., the other of the cathode 21 and anode 23) is fed into and along a track 211 of the lower guide assembly 200b until it reaches the winding pin 30. The free end of the second electrode 27b is fed into and captured within a gap defined between adjacent layers of separator 25 from the first separator supply 26a and separator 25 from the second separator supply 26b that have been coiled about and captured by the winding pin 30. The winding pin 30 is then rotated to finalize the capture the second electrode 27b. If the guide assemblies 200 had not previously been actuated into the second configuration following the winding capture of the free ends of the separator 25 (as shown in FIG. 12B), the indexing assemblies 300 are actuated to effectuate a transition of each guide assembly 200 to the second configuration, thereby completing the initial set-up of the winding system 10, and allowing the winding system 10 to proceed with operation in the coiling mode.

Although the winding system 10 has been described as comprising a pair of feed systems 100 (e.g., an anode feed system 100 and a cathode feed system 100), the winding system 10 may include any number of one or more feed systems 100. Also, although the feed systems 100 have been described and illustrated as being discrete structures from one another, in other embodiments, some or all of the components of a first feed system 100a and second feed system 100b may be integrated into a common, or shared, structure. Furthermore, although the guide assembly 200 has been described as comprising an electrode guide 210 and a separator guide 220, the guide assembly 200 may instead include only a single one of the electrode guide 210 or separator guide 220.

As used herein, the terms "about" and "approximately" will be understood by persons of ordinary skill in the art and will vary to some extent depending upon the context in which they is used. If there are uses of these terms which are not clear to persons of ordinary skill in the art, given the context in which it is used, "about" and "approximately" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

While certain embodiments have been illustrated and described, it should be understood that changes and modifications may be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations may be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions, or biological systems, which can of course vary. It is also to be understood that the terminology used herein is for the purpose of describing particular embodiments only and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like, include the number recited and refer to ranges which may be subsequently broken down into subranges as discussed above. Finally, as will be understood by one skilled in the art, a range includes each individual member.

Other embodiments are set forth in the following claims.

What is claimed:

1. A winding system, the winding system comprising:
a housing;
a winding pin rotatably mounted relative to the housing; and
a feed system supported by the housing, the feed system including:
  a guide assembly configured to guide an electrode and a separator towards the winding pin, the guide assembly comprising:
    a guide plate having a distal end and a proximal end, and an upper surface and a lower surface extending from the distal end to the proximal end;
    an electrode guide coupled with the upper surface of the guide plate, the electrode guide defining a track along the upper surface of the guide plate;
    a separator guide coupled with the lower surface of the guide plate, the separator guide located at the distal end of the guide plate, the separator guide defining a passageway along the lower surface of the guide plate at the distal end; and
    a roller element coupled with the guide plate at the distal end of the guide plate; and
  an indexing assembly operably attached to the guide assembly, the indexing assembly comprising an actuatable element and a movable portion comprising an attachment structure secured to the actuatable element and a carriage assembly secured to the guide plate, wherein upon actuation of the actuatable element the guide assembly is slidably moved relative to a base portion between a first configuration and a second configuration;
wherein a rotation of the winding pin relative to the housing is configured to cause the electrode and the separator fed towards the winding pin by the guide assembly to be coiled into a jellyroll configuration.

2. The winding system of claim 1, wherein upon actuation of the actuatable element, the indexing assembly is configured to transition the guide assembly between a first position and a second position different than the first position.

3. The winding system of claim 2, wherein a distance between a distal end of the guide assembly and the winding pin when the guide assembly is in the first position is different than a distance between the distal end of the guide assembly and the winding pin when the guide assembly is in the second position.

4. The winding system of claim 1, wherein the electrode guide includes a pair of walls laterally spaced apart from one another to define the track, at least one of the pair of walls being laterally adjustable relative to the guide plate such that a width of the track may be varied.

5. The winding system of claim 1, wherein the separator guide is adjustably supported relative to a width of the guide plate, such that a central axis along which the passageway defined by the separator guide extends may be laterally adjusted relative to a central axis along which the track defined by the electrode guide extends.

6. The winding system of claim 1, wherein the feed system comprises a first feed system and a second feed system, the electrode guided towards the winding pin by one of the first feed system and the second feed system comprising an anode, and the electrode guided towards the winding pin by the other of the first feed system and the second feed system comprising a cathode.

7. The winding system of claim 6, the first feed system further comprising a restraining element supported above the distal end of the guide plate, the restraining element configured to restrain movement of the electrode and the separator passing over a top of the roller element in a vertical direction.

8. The winding system of claim 6, wherein the first feed system and the second feed system are supported relative to the housing such that a lower portion of a distal end of the first feed system is arranged adjacent to an upper portion of a distal end of the second feed system, such that movement of the electrode and the separator passing over a top of the roller element of the second feed system in a vertical direction is restrained by the distal end of the first feed system.

9. A feed system for an electrode assembly winding system, the feed system comprising:
a guide assembly, the guide assembly including:
  a guide plate having a distal end and a proximal end, and an upper surface and a lower surface extending from the distal end to the proximal end;
  an electrode guide coupled with the upper surface of the guide plate, the electrode guide comprising a pair of walls that define a track along the upper surface of the guide plate;

a separator guide, the separator guide being coupled with the lower surface the guide plate at the distal end of the guide plate such that a passageway is defined along the lower surface of the guide plate at the distal end; and a roller element coupled with the guide plate at the distal end of the guide plate; and an indexing assembly, the indexing assembly including:

an actuatable element configured to be actuated between a first state and a second state; and a connector element comprising a movable portion comprising an attachment structure secured to the actuatable element and a carriage assembly secured to the guide plate, wherein upon actuation of the actuatable element between the first state and the second state, the guide assembly is moved relative to a base portion between a first configuration and a second configuration.

10. The feed system of claim 9, wherein the pair of walls includes at least one wall that is movably supported relative to the guide plate, wherein a width of the track is adjustable by moving a wall relative to a width of the guide plate.

11. The feed system of claim 9, wherein the separator guide is supported movably relative to the guide plate such that a center axis along which the passageway defined by the separator guide extends may be moved relative to a center axis along which the track defined by the electrode guide extends.

12. The feed system of claim 9, wherein the separator guide comprises a base plate and an adjustable plate movably supported relative to the base plate, and wherein a width of the passageway is adjustable by moving the adjustable plate relative to the base plate.

13. The feed system of claim 9, wherein the connector element includes:

the base portion having a rail; and wherein upon actuation of the actuatable element, the guide assembly is slidingly moved relative to the rail of the base portion between the first configuration and the second configuration.

14. The feed system of claim 9, further comprising a restraining element supported relative to the distal end of the guide plate, and extending above an upper surface of the roller element.

15. The feed system of claim 9, wherein the roller element includes a first end that is attached to the guide assembly, and a second free end.

16. A feed system for an electrode assembly winding system, the feed system comprising:

a guide assembly, the guide assembly including:

a guide plate having an upper surface and a lower surface;

an electrode guide supported relative to the upper surface of the guide plate, the electrode guide comprising a pair of walls that define a track along the upper surface of the guide plate;

a separator guide, the separator guide being supported relative to the guide plate such that a passageway is defined along the lower surface of the guide plate; and a roller element supported at a distal end of the guide plate; and an indexing assembly, the indexing assembly including:

an actuatable element configured to be actuated between a first state and a second state; and a connector element including a base portion having a rail and a movable portion comprising an attachment structure secured to the actuatable element and a carriage assembly secured to the guide plate;

wherein the connector element is operably attached to each of the actuatable element and the guide assembly such that upon actuation of the actuatable element between the first state and the second state, the guide assembly is moved between a first configuration and a second configuration; and wherein upon actuation of the actuatable element, the guide assembly is slidingly moved relative to the rail of the base portion between the first configuration and the second configuration.

17. The feed system of claim 16, further comprising a restraining element supported relative to the distal end of the guide plate, and extending above an upper surface of the roller element.

18. The feed system of claim 16, wherein the roller element includes a first end that is attached to the guide assembly, and a second free end.

* * * * *